Aug. 19, 1958   J. V. FRANQUEMONT   2,848,526
INTERCELL SEAL FOR MULTIPLE CELL BATTERY STRUCTURES
Filed June 12, 1953

INVENTOR
JOHN V. FRANQUEMONT
BY
ATTORNEY

United States Patent Office 2,848,526
Patented Aug. 19, 1958

2,848,526

INTERCELL SEAL FOR MULTIPLE CELL BATTERY STRUCTURES

John V. Franquemont, Lakewood, Ohio, assignor to Union Carbide Corporation, a corporation of New York Application June 12, 1953, Serial No. 361,371

3 Claims. (Cl. 136—111)

This invention relates to primary galvanic batteries comprising a stack of flat cells and refers more particularly to intercell seals for such batteries.

The multi-cell primary galvanic battery is a familiar articles of commerce and one which finds ever-increasing applications. As the demand for these convenient, portable electric power sources has increased it has also presented greater demands for decrease in size of the battery without undue sacrifice in service. Battery manufacturers have kept pace with these demands by structural changes in the batteries, by the use of more active materials, and by the elimination of waste space in individual cells in the battery as well as in the assembled battery itself.

Although these batteries are conventionally referred to as "dry" batteries, of course they contain a substantial quantity of moisture. And this quantity of moisture has necessarily been increased to improve battery life under adverse conditions of use. The increasing wetness of the mix has aggravated the old problems of venting, leakage and retention of moisture during storage.

The principal object of this invention is the provision of improved sealing and venting means for primary galvanic batteries. More specifically the invention has for an object a seal for the individual cells of a stacked multi-cell battery, which seal not only provides for venting excess gas from each of the cells but also inhibits drying out of the mix in the cells.

Figure 1:
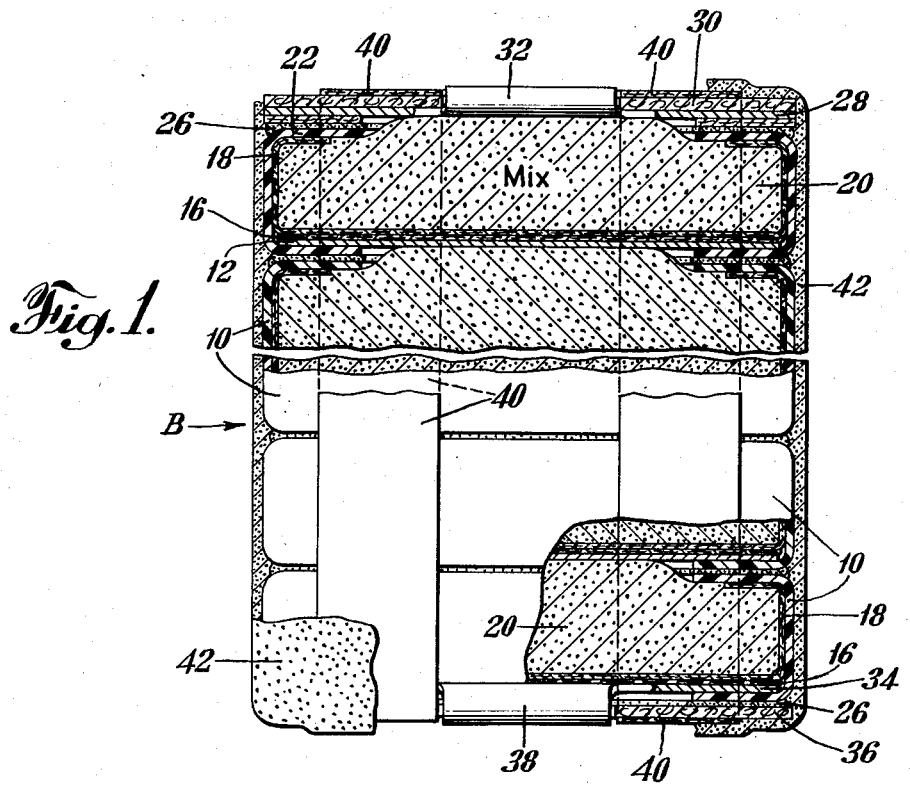
Figure 2:
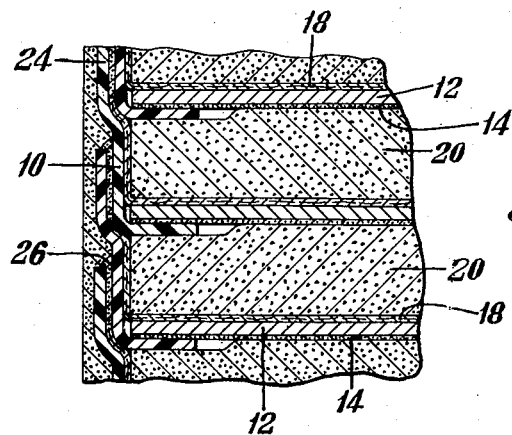

The invention by means of which these objects are achieved will be described with reference to the accompanying drawing in which:

Fig. 1 is a vertical view, partially in section, of an assembled battery embodying the invention, and Fig. 2 is a partial vertical sectional view of a modified battery construction embodying the invention.

The battery of the invention comprises a stack of cell component assemblies each assembly having its own container, a moisture-proof seal being provided between the individual containers. Referring to Fig. 1 of the drawing, a battery B embodying the invention may comprise a plurality of cell component assemblies each in its own container 10, the assemblies being so stacked that the cell components are in series relationship. The containers 10 are suitably composed of a thermoplastic material. Within each of the containers 10 are a conventional duplex electrode 12 of anode metal (usually zinc) having a conductive carbonaceous coating 14 (Fig. 2) on the bottom side thereof to provide a cathode for the adjacent cell component assembly when the containers are stacked to form the battery B. Adjacent to and in contact with the metal surface of the duplex electrode 14 are a separator 16 of paper or starch paste or other conventional separator material, and a conventional paper "blanket" 18 which lines the inner walls of the containers 10. Adjacent to the blanket 18 and substantially filling each of the containers 10 is a conventional electrolyte-wet depolarizer mix 20.

As shown in Fig. 1, the upper marginal portions of the containers 10 may be turned inwardly as at 22, or, as shown in Fig. 2 these portions of the containers 10 may be left upstanding as at 24 so that the containers may be nested one within another, both types of construction being conventional. In either case between the portion of the containers which would otherwise come into physical contact with each other, there is provided in accordance with this invention a layer 26 of a permanently soft sealing compound described in more detail below.

The cell component assemblies in their individual containers are stacked to provide the desired number of cells in series relationship, and suitable provision for making electrical contact to the battery is provided at the top and bottom of the stack. At the top, a duplex electrode 28 is in contact with the mix 20 of the top cell and above it is a fibrous end board 30 having an aperture therein for a metal terminal 32 attached to the electrode 28. The electrode 34 provided in the bottom cell of the stack is of anode metal without the conductive coating of the duplex electrodes, and below it is a fibrous end board 36 having an aperture for a metal terminal 38 attached to the electrode 34. The stack is maintained under endwise compression by tying tapes 40 and is provided with a conventional layer 42 of moisture-proof wax.

The sealing compound used in the invention is one which is permanently soft, but is not in the nature of an adhesive. In texture it should be like a heavy oil or stiff grease. Also it should be inert to battery constituents, but desirably should "wet" the material of which the cell component containers are formed. Any material having this combination of properties is satisfactory for the purposes of the invention. Specific examples of suitable materials are petrolatum, saponified fatty acids, oil-free waxes of low melting point, silicone fluids, polyvinyl ethyl ether and pure greases. The selection of a suitable material may be guided by the intended use of the battery. For instance, where the battery is to be used in temperate climates, petrolatum is entirely satisfactory. But where frigid or tropical temperatures may be encountered, a silicone compound is more desirable.

The seal of this invention fills adventitious voids between the individual containers of the battery and thus prevents loss of moisture. Being soft and deformable, however, it permits the escape of gas from the cells and thereby prevents build-up of internal pressure. Having yielded to relieve such pressure, the seal re-forms to continue its function of preventing moisture loss. Consequently the life of the battery is prolonged.

The seal of the invention may be provided simply by the application of the material, for example by spreading it on with a knife, to the surfaces of the cell containers which will be adjacent to those of neighboring containers when they are assembled to form the battery.

What is claimed is:

1. In a multi-cell primary galvanic battery comprising a stack of cell component assemblies in individual containers, said stack having an outer coating of moisture proof wax, and in addition, an improved seal and vent which comprises a layer of permanently soft, sealing compound having a texture like stiff grease and being inert to battery constituents, said layer intervening between the portions of each of said containers adjacent to others of said containers, said layer effectively sealing each of said cell component assemblies against loss of moisture therefrom but yielding under gas pressure to vent gas from said assemblies, and having yielded to relieve such pressure, said layer reforming to continue preventing moisture loss from said assemblies.

2. In a multi-cell primary galvanic battery comprising a stack of cell component assemblies in nested individual containers, an improved seal and vent which comprises a layer of permanently soft, sealing compound inert to battery constituents, said layer intervening between the portion of each of said containers adjacent to others of said containers, said layer effectively sealing said cell component assemblies against loss of moisture therefrom but yielding under gas pressure to vent gas from said assemblies, and having yielded to relieve such pressure, said layer reforming to continue preventing moisture loss from said assemblies.

3. In a multi-cell primary galvanic battery comprising a stack of cell component assemblies in nested individual containers, an improved seal and vent which comprises a layer of petrolatum intervening between the portions of each of said containers adjacent to others of said containers, said layer effectively sealing said cell component assemblies against loss of moisture therefrom but yielding under gas pressure to vent gas from said assemblies, and having yielded to relieve such pressure, said layer reforming to continue preventing moisture loss from said assemblies.

References Cited in the file of this patent

UNITED STATES PATENTS

| | | |
|---|---|---|
| 645,547 | Botz | Mar. 20, 1900 |
| 1,720,808 | Walden | July 16, 1929 |
| 2,272,969 | French | Feb. 10, 1942 |
| 2,416,576 | Franz et al. | Feb. 25, 1947 |
| 2,483,983 | Quinnell | Oct. 4, 1949 |
| 2,632,784 | Marsal et al. | Jan. 28, 1953 |

FOREIGN PATENTS

| | | |
|---|---|---|
| 122,697 | Great Britain | Jan. 30, 1919 |
| 423,165 | Great Britain | Jan. 28, 1935 |
| 564,264 | Great Britain | Sept. 20, 1944 |

OTHER REFERENCES

Clark, W. M.: "The Determination of Hydrogen Ions," The Williams & Wilkins Co., Baltimore, 1927, Ed. 2, page 185.